United States Patent
Arndt et al.

(10) Patent No.: US 9,346,037 B2
(45) Date of Patent: May 24, 2016

(54) COMPONENT HAVING A CATALYTIC SURFACE, METHOD FOR PRODUCING SAME AND USE OF SAID COMPONENT

(75) Inventors: Axel Arndt, Berlin (DE); Christian Doye, Berlin (DE); Ursus Krüger, Berlin (DE); Uwe Pyritz, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 711 days.

(21) Appl. No.: 13/699,375

(22) PCT Filed: May 17, 2011

(86) PCT No.: PCT/EP2011/057949
§ 371 (c)(1),
(2), (4) Date: Nov. 21, 2012

(87) PCT Pub. No.: WO2011/144598
PCT Pub. Date: Nov. 24, 2011

(65) Prior Publication Data
US 2013/0079218 A1    Mar. 28, 2013

(30) Foreign Application Priority Data
May 21, 2010    (DE) .......................... 10 2010 021 553

(51) Int. Cl.
*B01J 23/10*    (2006.01)
*B01J 23/32*    (2006.01)
(Continued)

(52) U.S. Cl.
CPC ......... *B01J 23/8892* (2013.01); *B01D 53/8675* (2013.01); *B01J 23/34* (2013.01); *B01J 23/688* (2013.01); *B01J 37/0225* (2013.01); *C23C 4/06* (2013.01); *C23C 4/085* (2013.01); *C23C 24/04* (2013.01); *C23C 30/00* (2013.01);
(Continued)

(58) Field of Classification Search
None
See application file for complete search history.

(56) References Cited

U.S. PATENT DOCUMENTS 3,701,822 A    10/1972    Negra et al. .................... 423/213
4,200,609 A    4/1980    Byrd .............................. 422/122
(Continued)

FOREIGN PATENT DOCUMENTS

AU    728032 B2    1/2001    ............. B01D 15/00
CN    1228036 A    9/1999    ............. B01D 15/00
(Continued)

OTHER PUBLICATIONS

Schmachtel, Sönke et al., "New Oxygen Evolution Anodes for Metal Electrowinning: $MnO_2$ Composite Electrodes," Journal of Applied Electrochemistry, vol. 39, No. 10, 14 pages, May 6, 2009.
(Continued)

*Primary Examiner* — Melvin C Mayes
*Assistant Examiner* — Michael Forrest
(74) *Attorney, Agent, or Firm* — Slayden Grubert Beard PLLC

(57) ABSTRACT

A component includes a catalyst surface having regions of $CeO_2$ and regions of $MnO_2$ that contact the regions of $CeO_2$. Said material pairings may provide an improved catalytic effect compared to pure oxides. Said surfaces can, for example, also be used in indoor air purification to reduce the ozone content. The surface can, for example, be applied by coating the component and processed by cold-gas spraying of, for example, particles made of $MnO_2$, to which $CeO_2$ is applied.

15 Claims, 2 Drawing Sheets

(51) Int. Cl.
*B01J 23/889* (2006.01)
*B01D 53/86* (2006.01)
*B01J 23/34* (2006.01)
*B01J 37/02* (2006.01)
*C23C 4/06* (2016.01)
*C23C 4/08* (2016.01)
*C23C 24/04* (2006.01)
*C23C 30/00* (2006.01)
*B01J 23/68* (2006.01)

(52) U.S. Cl.
CPC . *B01D2255/2065* (2013.01); *B01D 2255/2073* (2013.01); *B01D 2255/9022* (2013.01); *B01D 2259/4508* (2013.01); *B01D 2259/4591* (2013.01)

(56) References Cited

U.S. PATENT DOCUMENTS

| | | | |
|---|---|---|---|
| 4,302,490 A * | 11/1981 | Byrd | 427/301 |
| 4,892,637 A | 1/1990 | Sauer et al. | 204/291 |
| 5,011,752 A | 4/1991 | Kordesch et al. | 429/206 |
| 6,281,159 B1 | 8/2001 | Fromson et al. | 502/324 |
| 6,338,830 B1 | 1/2002 | Moskovitz et al. | 423/210 |
| 6,685,898 B2 | 2/2004 | Allen et al. | 423/213.2 |
| 7,037,596 B1 | 5/2006 | Benthien et al. | 428/632 |
| 9,029,287 B2 * | 5/2015 | Arndt et al. | 502/324 |
| 2003/0050188 A1 | 3/2003 | Ovshinsky et al. | 502/300 |
| 2003/0228414 A1* | 12/2003 | Smith et al. | 427/180 |
| 2004/0067176 A1 | 4/2004 | Pfeifer et al. | 422/177 |
| 2006/0182669 A1 | 8/2006 | Matumura et al. | 422/177 |
| 2007/0210010 A1 | 9/2007 | Miyake et al. | 210/762 |
| 2008/0112870 A1 | 5/2008 | Moini et al. | 423/237 |
| 2008/0193354 A1 | 8/2008 | Chen et al. | 423/247 |
| 2008/0237036 A1 | 10/2008 | Barker et al. | 204/290.13 |
| 2009/0035703 A1 | 2/2009 | Mennig et al. | 430/302 |
| 2011/0293495 A1 | 12/2011 | Arndt et al. | 423/219 |

FOREIGN PATENT DOCUMENTS

| | | | | |
|---|---|---|---|---|
| CN | 101259438 A | | 9/2008 | B01D 53/94 |
| DE | 19915377 A1 | | 10/2000 | A61L 9/00 |
| DE | 102005023871 A1 | | 11/2006 | B41C 1/10 |
| DE | 102008059165 A1 | | 5/2010 | B01D 53/86 |
| EP | 0369163 A1 | | 5/1990 | B01D 53/94 |
| EP | 0399302 A2 | | 11/1990 | B01D 53/86 |
| EP | 1355048 A1 | | 10/2003 | B01D 39/14 |
| EP | 2119491 A1 | * | 11/2009 | B01D 53/94 |
| GB | 2060427 A | * | 5/1981 | B01D 53/36 |
| JP | 2013078743 A | | 5/2013 | B01J 23/78 |
| WO | 2004/029327 A1 | | 4/2004 | C23C 18/18 |
| WO | WO 2004096435 A1 | * | 11/2004 | B01J 23/34 |
| WO | 2011/144568 A1 | | 11/2011 | B01D 53/66 |
| WO | 2011/144598 A1 | | 11/2011 | B01D 53/66 |

OTHER PUBLICATIONS

International Search Report and Written Opinion, Application No. PCT/EP2011/057884, 21 pages, Aug. 16, 2011.
International Search Report and Written Opinion, Application No. PCT/EP2011/057949, 21 pages, Aug. 16, 2011.
Jin, Lei et al., "γ-MnO2 Octahedral Molecular Sieve: Preparation, Characterization, and Catalytic Activity in the Atmospheric Oxidation of Toluene," Applied Catalysis A: General 355, 7 pages, Dec. 6, 2008.
Chinese Office Action, Application No. 201180025226.1, 15 pages, Feb. 21, 2014.
Jie, Wu et al., "Developments in Cold Gas Dynamic Spray Technology," Institute of Metal Research, The Chinese Academy of Sciences, 4 pages (Chinese language w/ English abstract), Jan. 31, 2003.
Chinese Office Action, Application No. 201180025167.8, 15 pages, Apr. 14, 2014.

* cited by examiner

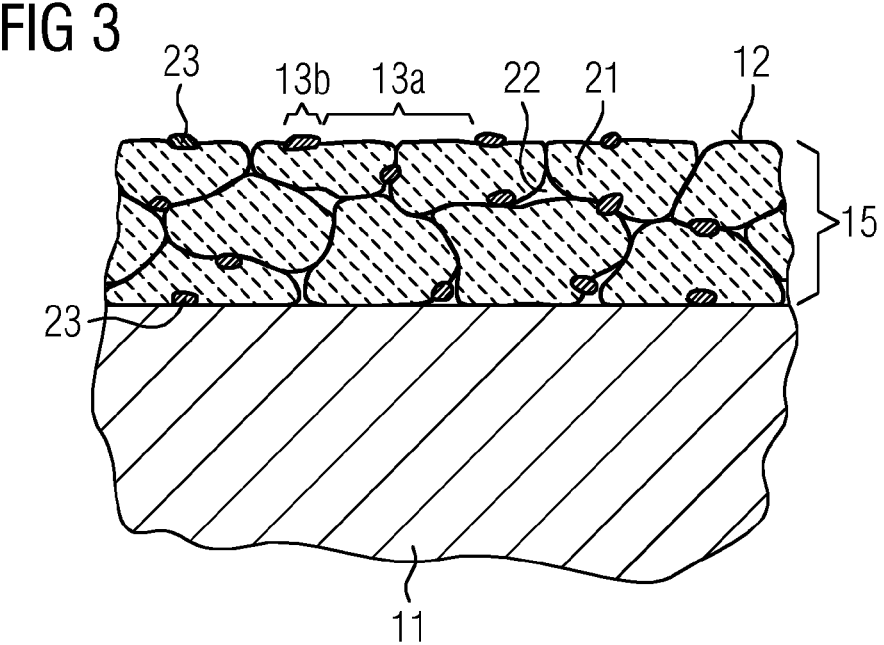
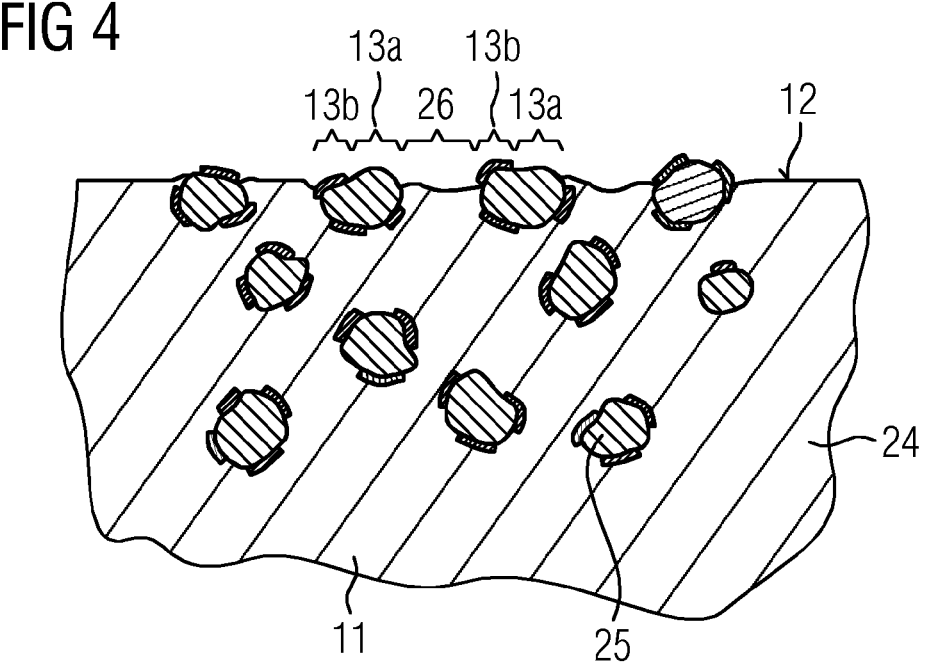

COMPONENT HAVING A CATALYTIC SURFACE, METHOD FOR PRODUCING SAME AND USE OF SAID COMPONENT

CROSS-REFERENCE TO RELATED APPLICATIONS

This application is a U.S. National Stage Application of International Application No. PCT/EP2011/057949 filed May 17, 2011, which designates the United States of America, and claims priority to DE Patent Application No. 10 2010 021 553.8 filed May 21, 2010. The contents of which are hereby incorporated by reference in their entirety.

TECHNICAL FIELD

The disclosure relates to a component part having a catalyst surface. The disclosure also relates to a process for producing a catalyst surface on a component part by cold gas spraying. The disclosure finally relates to use of such a component part.

BACKGROUND

A catalyst surface on a component part is known, for example, according to US 2003/0228414 A1. This catalyst surface can be obtained on the component part by direct deposition of a catalytically active substance. For this purpose, cold gas spraying is used, in which the particles of the catalytic laminate material are fed into what is called a cold gas jet, a process gas flowing at supersonic velocity. In the cold gas jet, these particles are accelerated toward the surface of the component part to be coated and remain adhering on this surface with conversion of the kinetic energy thereof.

SUMMARY

In one embodiment, a component part includes a catalyst surface with regions of $CeO_2$ and regions of $MnO_2$ in contact with the regions of $CeO_2$.

In a further embodiment, the manganese oxide is present at least partly in the $\gamma$ polymorph of $MnO_2$. In a further embodiment, the structural proportion of the manganese oxide present in the $\gamma$ polymorph is more than 50% by weight. In a further embodiment, the component has a coating which provides the regions of $CeO_2$ and the regions of $MnO_2$ on the catalyst surface. In a further embodiment, the component comprises a metallic material, especially of Ag or Ni or Cu or Co or Sn or Zn or alloys of at least one of these metals, the coating having been applied to this component part as a partly covering ceramic layer of $CeO_2$ and $MnO_2$, such that the component additionally provides a metallic region for the catalyst surface.

In a further embodiment, the coating has a ceramic layer which provides the regions of $MnO_2$ and $CeO_2$, on which an only partly covering metallic layer, especially of Ag or Ni or Cu or Co or Sn or Zn or alloys of at least one of these metals, has been applied, and which provides an additional metallic region for the catalyst surface. In a further embodiment, the coating comprises a metallic matrix which provides an additional metallic region for the catalyst surface, especially composed of Ag or Ni or Co or Cu or Sn or Zn or alloys of at least one of these metals, into which particles composed of $MnO_2$ and $CeO_2$ are embedded. In a further embodiment, the surface area proportion of the regions of $MnO_2$ and the regions of $CeO_2$, in relation to the total area of the catalyst surface, is at least 10%, e.g., between 30 and 60%, e.g., 50%. In a further embodiment, the component or a layer applied thereto comprises a material other than $CeO_2$ and $MnO_2$, and particles present therein and/or thereon each provide the regions of $CeO_2$ and the regions of $MnO_2$ on the surface thereof. In a further embodiment, the component part has a grid structure. In a further embodiment, the component part is configured as a ventilation grid, especially as an outlet grid of an extractor hood or of a flow-through plasma generator.

In another embodiment, a process is provided for producing a catalyst surface on a component part by cold gas spraying, wherein the catalyst surface is produced by spraying of oxide particles comprising a mixture of $MnO_2$ particles and $CeO_2$ particles or particles composed of $CeO_2$ and $MnO_2$.

In a further embodiment, the oxide particles cover only regions of the catalyst surface, and metallic regions of Ag or Ni or Co or Cu or Sn or Zn or alloys of at least one of these metals are also provided to the catalyst surface, each of which adjoin the regions of $MnO_2$. In a further embodiment, $MnO_2$ particles having at least partly the $\gamma$ polymorph of the $MnO_2$ structure are used, and the cold gas spraying is conducted with operating temperatures below the decomposition temperature of manganese oxide. In a further embodiment, a mixture of the oxide particles and metallic particles of Ag or Ni or Co or Cu or Sn or Zn or alloys of at least one of these metals is used for the metallic regions of the catalyst surface. In a further embodiment, the specific surface area which forms the catalyst surface of the layer produced is controlled by the energy input into the cold gas jet.

In another embodiment, a component part as disclosed above is used for reducing the ozone content of a gas which passes over the catalyst surface.

BRIEF DESCRIPTION OF THE DRAWINGS

Example embodiments will be explained in more detail below with reference to figures, in which:

FIGS. 1 to 4 illustrate different working examples of the component part with various catalytic surfaces, according to various example embodiments.

DETAILED DESCRIPTION

Figure 1:
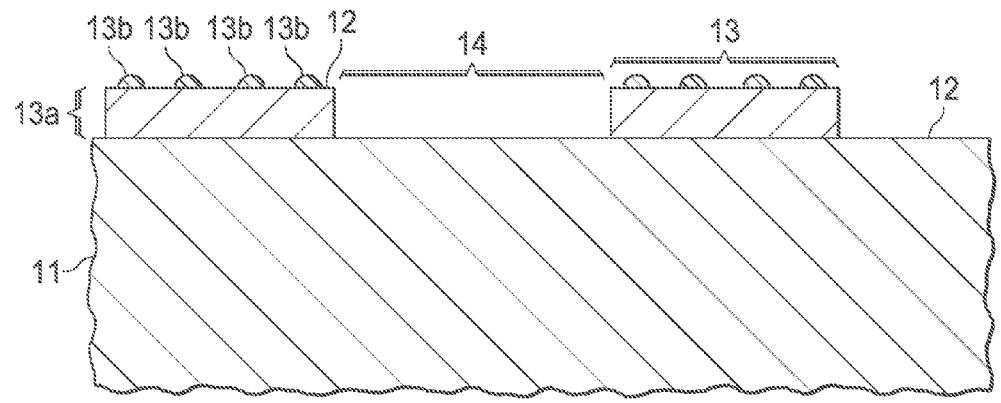

Some embodiments provide a component part having a catalyst surface, a process for production thereof and use of said component, wherein the catalyst surface should have a comparatively high catalytic activity.

Embodiments provide a component part and a cold spraying process, wherein the catalyst surface has regions of $CeO_2$ and regions of $MnO_2$ in contact with the latter regions. The regions of $MnO_2$ and $CeO_2$ constitute a ceramic catalyst surface and are also referred to hereinafter in this context as ceramic regions.

In order to produce the disclosed layer, the cold gas spraying should produce the catalyst surface by spraying of oxide particles comprising a mixture of $MnO_2$ particles and $CeO_2$ particles or particles composed of $MnO_2$ and $CeO_2$, the $MnO_2$ forming only regions of the catalyst surface and also providing, in a particular embodiment, metallic regions of the catalyst surface each adjoining the regions of $MnO_2$. The metallic regions may, as will be explained in detail hereinafter, be provided by the metallic surface of the component part to be coated, or by addition of metallic particles to the cold gas jet. If the above-specified alloys are to be obtained, this can be accomplished either by use of powders of the desired alloy, or particles of different composition are mixed with one another in order to arrive at the desired alloy composition, for example particles of pure Co, Sn, Zn, Cu, Ag or Ni. The latter process is also referred to as mechanical alloying.

The use of $MnO_2$ as a pair with $CeO_2$ and especially also with metallic regions makes it possible in accordance with the disclosure to achieve a particularly high catalytic activity of the catalyst surface formed. It has been found that, surprisingly, the catalytic activity of $MnO_2$, which is known per se, can be increased by regions of $CeO_2$ at the surface, even though the catalytic surface area of $MnO_2$ available is reduced overall. This is contrary to the result to be expected, in that a reduction in the real surface area of $MnO_2$ available, in the case of incomplete coverage of the surface of the component part, should be associated with a proportional loss of catalyst activity.

The improvement in the catalytic action can be explained by the fact that the $CeO_2$ is able to simply release and absorb oxygen. This can be expressed in greatly simplified form by the following reaction equation:

$$CeO_2 \leftrightharpoons CeO_{2-x} + x/2 O_2.$$

This property is particularly advantageous especially in the case of ozone decomposition to oxygen, since the oxygen bonds of the ozone have to be split. This gives rise to $O_2$ and atomic oxygen, and the property of $CeO_2$ being able to absorb atomic oxygen lowers the energy required to split the ozone bond. In combination with $MnO_2$, accelerated degradation of ozone is thus achieved.

In one embodiment, the $MnO_2$ is present at least partly in the γ polymorph. The γ polymorph is a structure of the crystal formed by $MnO_2$ which advantageously features particularly strong catalytic action. However, the real structure of $MnO_2$ is generally not present exclusively in the γ polymorph, but partly also in other polymorphs (for example the β polymorph of $MnO_2$). However, in a particular embodiment, the structure proportion of $MnO_2$ in the γ polymorph should be more than 50% by weight.

In one embodiment, the component part has a coating which provides the regions of $CeO_2$ and the regions of $MnO_2$ on the catalyst surface. Such a coating can advantageously be produced with comparatively low material expenditure on different surfaces, such that the component can be produced from a material which can be selected, for example, with regard to the end use thereof. A suitable coating process is advantageously, for example, cold gas spraying (further details thereof follow). Here too, it is possible, for example, to employ a PVD process.

In another embodiment, the component part comprises a metal which provides a metallic region, and an only partly covering ceramic layer of $MnO_2$ and $CeO_2$ has been applied to this component part. This component part comprises, for example, component parts made from Cu, Sn or Zn, which already provide one constituent required for the production of the catalytic surface on the basis of their material composition. On these component parts, production of the disclosed surface is advantageously possible in a particularly simple manner by applying a non-covering layer which provides other regions of the surface (namely $MnO_2$ and $CeO_2$).

In another embodiment, the component part has a coating which provides metallic, catalytically active regions and the regions of $MnO_2$ and of $CeO_2$ on the surface. In this variant, it is possible to coat components of various materials, the disclosed catalytic properties of the layer advantageously being caused solely by the nature of the layer or the catalytic surface area formed thereby. In this context, it is necessary in each case to select a suitable coating process for the component part material in question.

In a further embodiment, the coating may comprise a metallic matrix which provides an additional metallic region for the catalyst surface, especially of Ag or Ni or Co or Cu or Sn or Zn or alloys of at least one of these metals, into which particles composed of $MnO_2$ and $CeO_2$ are embedded. Alloys of these metals are understood to mean all alloys which comprise Ag and/or Ni and/or Co and/or Cu and/or Sn and/or Zn as alloy constituents, the proportions of these metals (irrespective of whether one or more of these metals is or are present in the alloy) being more than 50% by weight. Further alloy constituents, for example other metals, may thus be represented with a proportion of less than 50% by weight.

In order to ensure the required contact between $MnO_2$ and $CeO_2$, the particles may either be embedded into the matrix in a density at which contact is probable on the basis of the statistical distribution. Another option is to use particles whose surface comprises both $MnO_2$ and $CeO_2$. Such particles can be formed, for example, essentially from $MnO_2$, in which case $CeO_2$ is deposited by means of a PVD process (physical vapor deposition) on the particles of $MnO_2$. The formation of the catalyst surface from a metal with ceramic particles has the advantage that the ceramic particles, which are difficult to deform, can be incorporated in a simple manner into a matrix which forms from metallic particles, for example by cold gas spraying. Given correct selection of the metal, moreover, the catalytic action of the catalyst surface is favorably influenced.

This advantageously enables production of component parts with comparatively efficient catalyst surfaces, by coverage at least of regions of the catalyst surface, rather than solely with $MnO_2$ and $CeO_2$, additionally also with a metal. The surface of the component part must thus not be covered completely with the catalytically active metallic regions or the regions of $MnO_2$ and $CeO_2$. Merely a partial coating is already sufficient to achieve the catalytic action. Depending on the application, this should be selected at such a level that the catalytic surface provided is sufficient for the desired effect for conversion, for example, of ozone. The region of $MnO_2$ in relation to the total area formed by the two regions should be at least 10%, e.g., 30 to 70%, e.g., 50%.

Advantageously, the component part or a layer applied thereto may also comprise a (nonmetallic) material other than $CeO_2$ and $MnO_2$, and particles present therein and/or thereon may each provide the regions of $CeO_2$ and the regions of $MnO_2$ on the surface thereof. It is advantageously possible here to select any materials, provided that they can be coated with $CeO_2$ and/or $MnO_2$ or this ceramic material can be incorporated into these materials. For example, polymeric component parts can be provided with catalytic surfaces in this way. In this case, as already mentioned, $CeO_2$ and $MnO_2$ should be used with direct contact to one another, in order that the disclosed optimization of catalytic action can be utilized.

Particularly advantageously, the component part may have a grid structure. This may be a grid with a two-dimensional arrangement, i.e. an essentially flat component part. It is also possible to form three-dimensional grid structures which can be produced, for example, by means of rapid prototyping technologies. The grid structures offer the advantage that, on the one hand, the surface area available for the application of the catalytic active partners is increased, but, on the other hand, the flow resistance generated by the grid structure is comparatively minor. Grid component parts can therefore advantageously be used in ventilation ducts. An example of a particularly advantageous use is that in extractor hoods, in which case the grid structure forms the outlet grid thereof for cleaned waste air. This application is used in what are called recirculating air hoods, in which, in contrast to vented air hoods, the air sucked in is not removed from the building but remains therein.

In order to achieve, in extractor hoods working by the air recirculation principle, not only freeing of the air from solids, aerosols and ultrasmall particles, as present, for example, in cooking vapor, but also freeing from odors, certain conventional systems use plasma generators having a high-voltage discharge source with which the air is enriched with atomic oxygen. The latter brings about a decomposition or oxidation process which fragments the carbon compounds responsible for the odors which arise and eliminates the odors in this way. However, this process also gives rise to ozone, which can be converted to diatomic oxygen by a catalytic route by the disclosed component parts.

This advantageously makes it possible to dispense with activated carbon filters, which disadvantageously offer comparatively high air resistance to the air flow in the extractor hood and also have to be changed at regular intervals.

The process used for production of the layer on the component part may, for example, be cold gas spraying, in which case the catalytic surface is obtained by spraying oxide particles comprising a mixture of $MnO_2$ particles and $CeO_2$ particles or comprising particles composed of $MnO_2$ and $CeO_2$. In this case, the $MnO_2$ and $CeO_2$ each form only regions of the catalytic surface. Catalytically active metallic regions may additionally be formed from Ag or Ni or Co or Cu or Sn or Zn or alloys of at least one of these metals. The metallic regions may, as already described, either be provided by the component itself, or they are added as particles to the cold gas jet, such that the metallic regions of the surface are also formed by the layer which forms. This advantageously allows the catalytic surface to be better matched to the corresponding application.

More particularly, it is also possible to use $MnO_2$ particles which at least partly have the γ polymorph of the $MnO_2$ structure. In this case, the cold gas spraying always has to be conducted with operating temperatures below the decomposition temperature of the γ polymorph. This temperature is 535° C. For process technology purposes, in the selection of the temperature of the cold gas jet, a certain safety margin from this decomposition temperature may be observed. On the other hand, it has been found that briefly exceeding this temperature when the $MnO_2$ particles hit the surface has no effects in terms of structure, because this temperature increase occurs extremely locally only in the surface region of the processed $MnO_2$ particles. The respective core of the particles, which remains within an uncritical temperature range, is apparently able to sufficiently stabilize the γ polymorph of the particle structure, such that the γ polymorph of the $MnO_2$ structure is also preserved at the catalytically active surface of the particles.

Moreover, heating of the $MnO_2$ above 450° C. leads in principle to a conversion of the $MnO_2$ to $Mn_2O_3$. This process, however, proceeds only gradually, and so brief exceedance of the temperature, as occurs in the cold gas spraying, is not harmful.

In order to preserve the excellent catalytic properties of the $MnO_2$, the γ polymorph of the structure must be at least partly present in the $MnO_2$ particles. This can be implemented through a mixture of the $MnO_2$ particles with manganese oxide particles of other polymorphs (e.g. β polymorph of $MnO_2$). Another option is that the particles comprise phase mixtures, such that the γ polymorph of $MnO_2$ is not the only one present in the particles.

It is also advantageous when the oxide particles (i.e. particles composed of $MnO_2$ and $CeO_2$ or particle mixtures of $MnO_2$ particles and $CeO_2$ particles) processed are nanoparticles having a diameter of >100 nm. Nanoparticles in the context of this disclosure are understood to mean particles of diameter <1 μm. This is because it has been found that, surprisingly, such small oxide particles of $MnO_2$ can be deposited with a high deposition efficiency on the catalytic surface. Normally, it is assumed, in contrast, that particles of less than 5 μm cannot be deposited by cold gas spraying, since, due to the low mass of these particles, the kinetic energy imparted by the cold gas jet is insufficient for deposition. It is not possible to explain why this is not the case specifically for $MnO_2$ particles or $CeO_2$ particles. It appears that, as well as the effect of kinetic deformation, other adhesion mechanisms are also involved in the layer formation process.

The processing of nanoparticles of $MnO_2$ has the advantage that a comparatively high specific surface area and hence a strong catalytic effect can be achieved with comparatively little material. The boundaries between the regions of $MnO_2$, of $CeO_2$ and of any metallic regions of the catalytic surface are also advantageously greatly prolonged in this way, which likewise causes a high level of catalytic properties.

It is advantageous when a mixture of $MnO_2$ particles and metallic particles of Ag or Ni or Co or Cu or Sn or Zn or alloys of at least one of these metals is used for the metallic regions of the catalytic surface. More particularly, in that case, through suitable selection of temperature and particle velocity in the cold gas jet, it is possible to control the energy input into the particles such that the specific (or internal) surface area which forms the catalytic surface in the layer produced is controlled. Thus, a higher porosity of the layer produced can increase the internal surface area in order to provide an increased catalytic surface area. This allows the catalytic action to be increased. In contrast, it may also be advantageous when the surface is very smooth, in order to counteract any soiling tendency.

As well as deposition by cold gas spraying, other production methods are of course also conceivable. For example, the catalytic surface can be produced electrochemically when an additional metallic region of the catalytic surface is provided. In this case, the metallic region of the catalytic surface is deposited electrochemically as a layer from an electrolyte in which the oxide particles ($MnO_2$ and $CeO_2$) are suspended. These are then incorporated into the layer which forms during the electrochemical deposition process, and hence also form the regions of $MnO_2$ and of $CeO_2$ at the layer surface.

A further process can be obtained by producing the layer from a ceramic at least comprising $MnO_2$ and $CeO_2$. For this purpose, a mixture of preceramic polymers which form precursors of the desired ceramic, and optionally also metal particles, can be applied in a solution to the component part to be coated. First of all, the solvent is vaporized, then a heat treatment which is advantageously below the decomposition temperature of the γ polymorph of $MnO_2$ (535° C.) results in conversion to the ceramic. Even better, the temperature remains below 450° C. in order to prevent the formation of $Mn_2O_3$.

The processes mentioned can also produce, inter alia, the configurations of the disclosed component part which follow. For instance, the coating produced may have a metallic layer on which an only partly covering layer of $MnO_2$ and $CeO_2$ has been applied. The metallic layer thus forms the additional metallic region of the surface which appears at the sites with no coverage by the layer of $MnO_2$. In this component part configuration, advantageously, only a comparatively small region of $MnO_2$ and $CeO_2$ is needed. It is also conceivable in this case to employ the manufacturing processes detailed above in combination. For example, it is possible to produce the metallic layer by electroplating, and the only partly covering layer of $MnO_2$ and $CeO_2$ by cold gas spraying.

Another option is for the coating to have a ceramic layer providing the regions of $MnO_2$ and $CeO_2$, on which an only partly covering metallic layer has been applied. This configuration of the component part is of significance when the properties of the ceramic layer, for construction reasons, are advantageous for the component part (for example corrosion protection).

It is also possible that the coating comprises a ceramic which provides the regions of $MnO_2$ and $CeO_2$, into which metallic particles are embedded as an additional metallic region. This is advantageous especially when the ceramic layer is subject to wear and the catalytic properties thereof are to be maintained with advancing wear, i.e. removal of the layer. The latter is ensured by virtue of the removal of the ceramic layer always exposing metallic particles. Of course, it is also conceivable that the layer has a metallic matrix into which the oxide particles are embedded. For this layer too, the argument applies that, in the case of layer removal, the catalytic properties thereof are preserved.

The configuration of the component part may also be such that it or a layer applied thereto comprises a material other than $MnO_2$ and $CeO_2$ (e.g., also other than the further metallic region) and particles present therein (in the case of wear, see above) and/or thereon each provide the regions of $MnO_2$ and of $CeO_2$ (optionally also the metallic regions with catalytic properties) at the surface thereof (what is meant is the surface of the particles). These are advantageously tailored particles with catalytic properties which can be used universally on any surface or in any matrix. It is necessary here in each case to select the process suitable for introduction or application. With this measure, it is possible, for example, also to produce component parts composed of polymer with catalytic properties. The particles introduced into the layer or the component part are either exposed in the course of wear or, in the case of a porous structure of the component part, may also be involved in the catalytic action when they form the walls of the pores.

Finally, the disclosure relates to a use of the component part already described for reduction of the ozone content of a gas which passes over the catalyst surface. This gas may be provided primarily by the earth's atmosphere. Under particular conditions, the air is enriched with ozone, for example on hot summer days in city centers or else in higher atmospheric layers which are utilized by aviation. Since ozone is harmful to the health of the human organism, breathable air which is pumped from the atmosphere into the interior of motor vehicles or else into the passenger cabin of an aircraft can be substantially freed of ozone by means of the disclosed catalyst surface. In addition, the ozone content is elevated, for example, in the waste air region of extractor hoods with what are called plasma cleaning units for the waste air.

It will be appreciated that applications in chemical process technology are also conceivable.

The catalyst surface can be configured, for example, as an inner lining of air-conducting conduit systems. This has the advantage that, by virtue of provision of the catalyst surface, no additional flow barrier need be incorporated into the air-conducting ducts. In order to increase the catalyst surface area available, the air conduit system may also be provided with an air-pervious insert around which the air sucked in must flow.

FIGS. 1 to 4 each show a component part 11 with a surface 12 having catalytic properties (also called catalyst surface). These properties are obtained by providing the surface in each case having a region 13a comprising $MnO_2$, and also a region 13b of $CeO_2$ (referred to collectively as region 13). The component part could be, for example, an air-conducting duct, the inner walls of which form said surface.

However, the structure of the component parts 11, each of which is shown in section, has differences. The component part according to FIG. 1 itself comprises a catalytically active metal, for example Ni, such that the surface 12 thereof automatically provides a metallic region 14. Also formed on the surface 12 are island-like regions of $MnO_2$ which provide the region 13a. The island-like regions in turn bear non-covering regions 13b of $CeO_2$, such that common boundaries in the catalytic surface 12 arise between these regions. These regions 13a, 13b can be applied, for example, as a non-covering coating by cold gas spraying.

Figure 2:
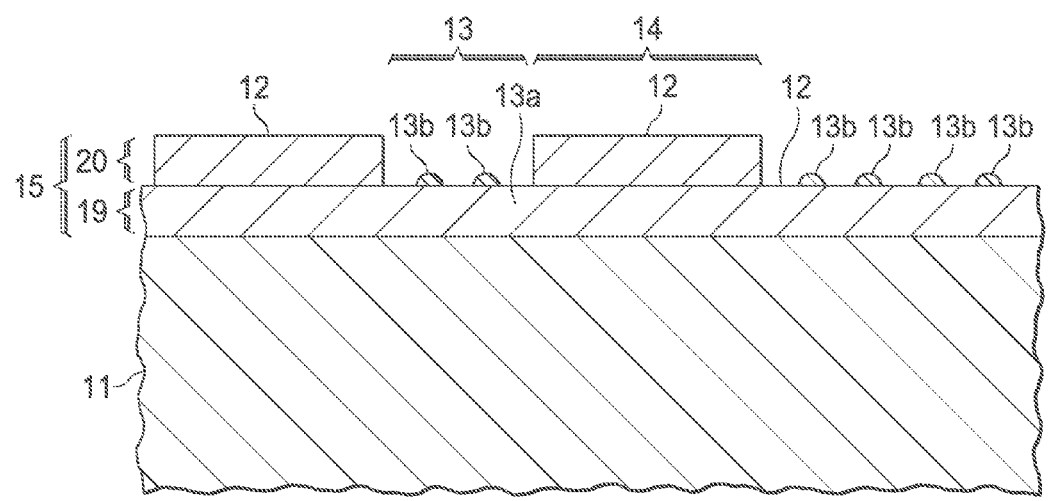

FIG. 2 shows a component part 11 which comprises a material unsuitable for production of the catalytic properties of the surface. Therefore, a catalytically active layer 15 is applied to this component part 11. The layer 15 comprises two layers 19, 20. The layer 19 is formed from $MnO_2$. This layer provides, as becomes clear from FIG. 2, proportions of the catalytic surface 12 which form the regions of $MnO_2$ on the catalytic surface. Additionally applied to the layer 19 is a non-covering layer 20 of a metal which itself has catalytic action and is provided in the metallic regions in question. These metallic regions 14 directly adjoin the catalytic regions 13 which are formed by the regions of $MnO_2$ 13a and regions of $CeO_2$ 13b. The regions of $CeO_2$ take the form of islands on the layer 19 of $MnO_2$, so as to form common boundaries in the catalyst surface 12 between these said regions.

In FIG. 3, the coating 15 is formed by a ceramic matrix 21 of $MnO_2$, this having pores 22 which increase the inner surface area compared to the outer surface area 12 of the component part and thus also enhance any catalytic effect. Provided in the ceramic matrix 21 are particles 23 of $CeO_2$ which both provide the region 13b ($CeO_2$) at the surface 12 and can be catalytically active in the pores. The ceramic matrix 21 provides the region 13a ($MnO_2$). As also in FIG. 2, the component part 11 according to FIG. 3 may comprise any material, it being necessary merely to ensure the adhesion of the coating 15 on the component part 11.

The component part 11 according to FIG. 4 has a matrix of any desired material 24, for example polymer. Introduced into this material are particles 25, the respective surfaces of which have both the metallic regions 13b of $CeO_2$ and the regions 13a of $MnO_2$. In the working example according to FIG. 4, the particles themselves comprise $MnO_2$, and regions 13b of $CeO_2$ are formed on the surface of the particles. Of course, the reverse case is also conceivable. The particles are partly exposed at the surface 12 of the component part 11, as a result of which the regions 13b and the regions 13a are formed. In addition, there are regions 26 of polymer on the surface 12, these being catalytically inactive. The ratio of said regions can be influenced directly by the filling level of particles 25 in the material 24.

The figures do not show the particularly advantageous possibility also of providing a powder composed of metallic particles. These may be coated with regions 13a, 13b of $MnO_2$ and $CeO_2$, these regions being in contact with formation of common boundaries. In this way, a powder is obtained which has the disclosed catalytic properties and can be processed, for example, by cold gas spraying. For example, it would be possible to coat a polymeric surface so as to result in a structure of the catalytic surface corresponding to the surface in FIG. 4. It is also possible with the particles themselves to form a layer structure by cold gas spraying, which would result in a layer structure according to FIG. 3, except that the matrix 21 would itself be metallic and the coating of the particles would provide both the region 13a and the region 13b. In the case of selection of a suitable metal for the particles, this may also be involved in the catalytic reactions which proceed.

What is claimed is:

1. A component part, comprising:
   a catalyst surface including:
      surface regions of CeO2,
      surface regions of MnO2 in contact with and surrounding the surface regions of CeO2, to define a plurality of islands of CeO2 physically separated and spaced apart from each other at the catalyst surface by the surface regions of MnO2, and
   metallic surface regions of Ag or Ni or Co or Cu or Sn or Zn or alloys of at least one of these metals, the metallic surface regions being adjacent and in contact with the surface regions of MnO2.

2. The component part of claim 1, wherein the manganese oxide comprises the γ polymorph of MnO2.

3. The component part of claim 2, wherein the structural proportion of the manganese oxide present in the γ polymorph is more than 50% by weight.

4. The component part of claim 1, wherein the surface regions of CeO2 and the surface regions of MnO2 are provided in a coating provided on the catalyst surface.

5. The component part of claim 4, wherein:
   the component part comprises Ag or Ni or Cu or Co or Sn or Zn or alloys of at least one of these metals, and
   the coating is applied to the component part as a partly covering ceramic layer of CeO2 and MnO2, such that the component additionally provides a metallic surface region for the catalyst surface.

6. The component part of claim 4, wherein:
   the coating comprises a ceramic layer that provides the surface regions of MnO2 and CeO2, and
   the ceramic layer is partially covered by a metallic layer of Ag or Ni or Cu or Co or Sn or Zn or alloys of at least one of these metals.

7. The component part of claim 4, wherein the coating comprises a metallic matrix that provides an additional metallic surface region for the catalyst surface, the metallic surface region comprising Ag or Ni or Co or Cu or Sn or Zn or alloys of at least one of these metals, into which particles composed of MnO2 and CeO2 are embedded.

8. The component part of claim 5, wherein the surface area proportion of the surface regions of MnO2 and the surface regions of CeO2, in relation to the total area of the catalyst surface, is between 30 and 60%.

9. The component part of claim 1, wherein the component or a layer applied thereto comprises a material other than CeO2 and MnO2.

10. The component part of claim 1, wherein the component part comprises a grid structure.

11. The component part of claim 10, wherein the component part comprises an outlet grid, wherein the catalyst surface is formed on the outlet grid.

12. A process for producing a catalyst surface on a component part by cold gas spraying, comprising:
   forming over the component part a coating comprising surface regions of MnO2 and metallic surface regions adjacent the surface regions of MnO2, the metallic surface regions comprising Ag or Ni or Co or Cu or Sn or Zn or alloys of at least one of these metals,
   spraying oxide particles comprising a mixture of MnO2 particles and CeO2 particles or particles composed of CeO2 and MnO2 over at least the surface regions of MnO2 to define a plurality of islands of CeO2 and MnO2 physically separated and spaced apart from each other by portions of the surface regions of MnO2 that are uncovered by the oxide particles,
   wherein the oxide particles, the portions of the surface regions of MnO2 that are uncovered by the oxide particles, and the metallic surface regions collectively define the catalyst surface.

13. The process of claim 12, wherein:
   the MnO2 particles comprise the γ polymorph of MnO2, and
   the cold gas spraying is conducted with operating temperatures below a decomposition temperature of manganese oxide.

14. The process of claim 12, wherein a mixture of the oxide particles and metallic particles of Ag or Ni or Co or Cu or Sn or Zn or alloys of at least one of these metals is used for the metallic surface regions of the catalyst surface.

15. The process of claim 12, comprising controlling a specific surface area that forms the catalyst surface of the layer produced by controlling an energy input into the cold gas jet.

* * * * *